P. J. MOLLOY.
WATER HEATING AND CIRCULATING SYSTEM.
APPLICATION FILED DEC. 28, 1920.

1,411,291.

Patented Apr. 4, 1922.
2 SHEETS—SHEET 1.

Inventor
PATRICK J. MOLLOY

By

C. L. Parker  Attorney

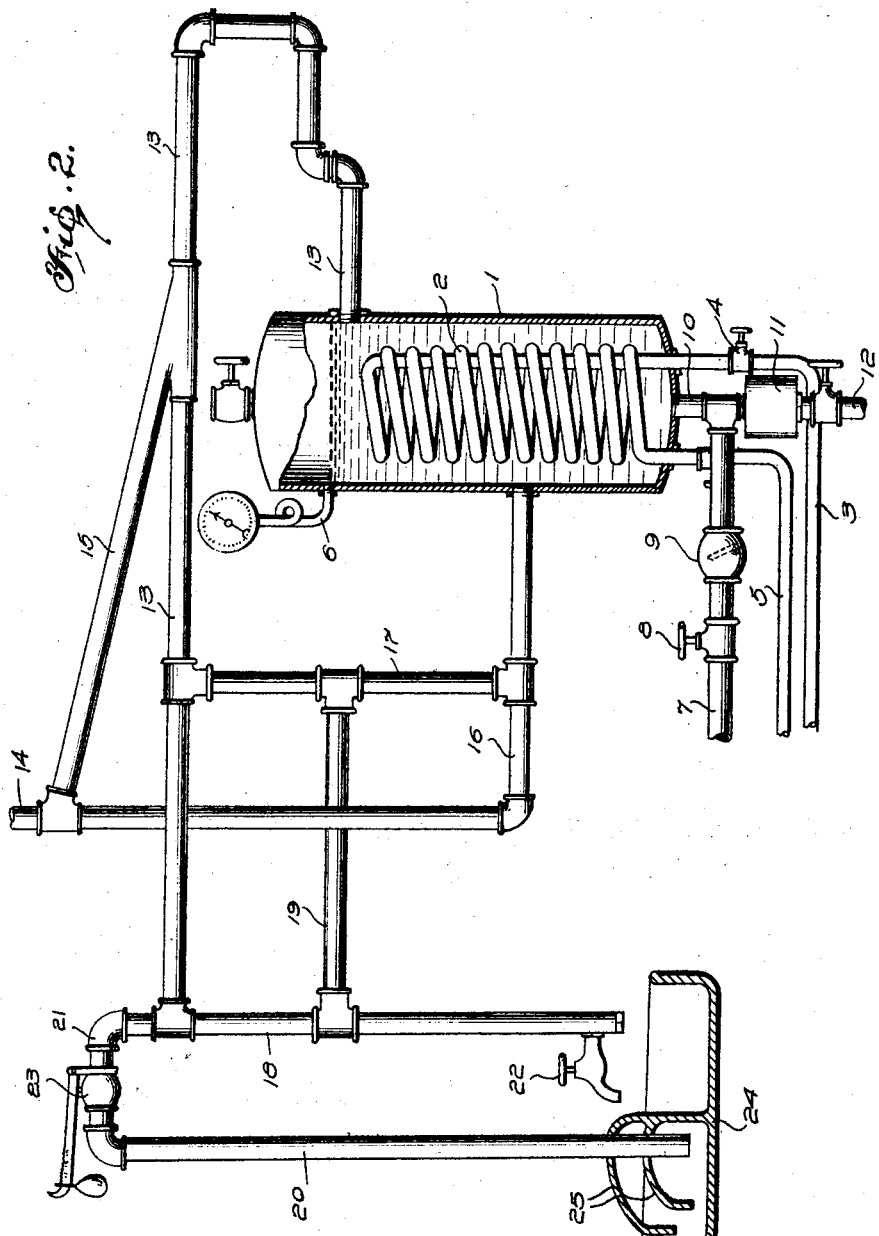

UNITED STATES PATENT OFFICE.

PATRICK J. MOLLOY, OF NEW YORK, N. Y.

WATER HEATING AND CIRCULATING SYSTEM.

1,411,291.　　　　Specification of Letters Patent.　　Patented Apr. 4, 1922.

Application filed December 28, 1920. Serial No. 433,579.

*To all whom it may concern:*

Be it known that I, PATRICK J. MOLLOY, a citizen of the United States, residing at New York, in the county of Bronx and State of New York, have invented certain new and useful Improvements in Water Heating and Circulating Systems, of which the following is a specification.

This invention relates to water heating and regulating systems, and it comprises a water heater, a vertical lead pipe connected to said heater, said lead pipe being provided with a pair of branches connected to the heater, equalizing return pipes arranged between said branches, and means for automatically controlling the pressure in said system.

In the present invention, I have provided a water heating and regulating system wherein a single vertical lead pipe is employed, but in which all the practical advantages of a two-pipe system are obtained.

In the present invention, I employ a water heater of any suitable type connected to the main source, and provided with means for automatically admitting water into the system until a certain predetermined pressure is reached. The heater is provided with an outlet pipe arranged near the top, whereby hot water will be taken from the boiler, and this outlet is connected to the lower part of the vertical pipe or other supply pipe delivering the heated water to the different floors of the building, or other places where it is to be used. The cold water returns through the same pipe to a point near the heater, where it enters a return branch pipe communicating with the heater in the lower portion thereof. Means are provided for automatically maintaining the pressure in the system at a predetermined point and discharging a portion of the water from the system when the pressure exceeds a predetermined limit.

In the accompanying drawings, I have shown one embodiment of my invention. In this showing:

Figure 2 is a detail view showing the heater in section.

Figure 1:
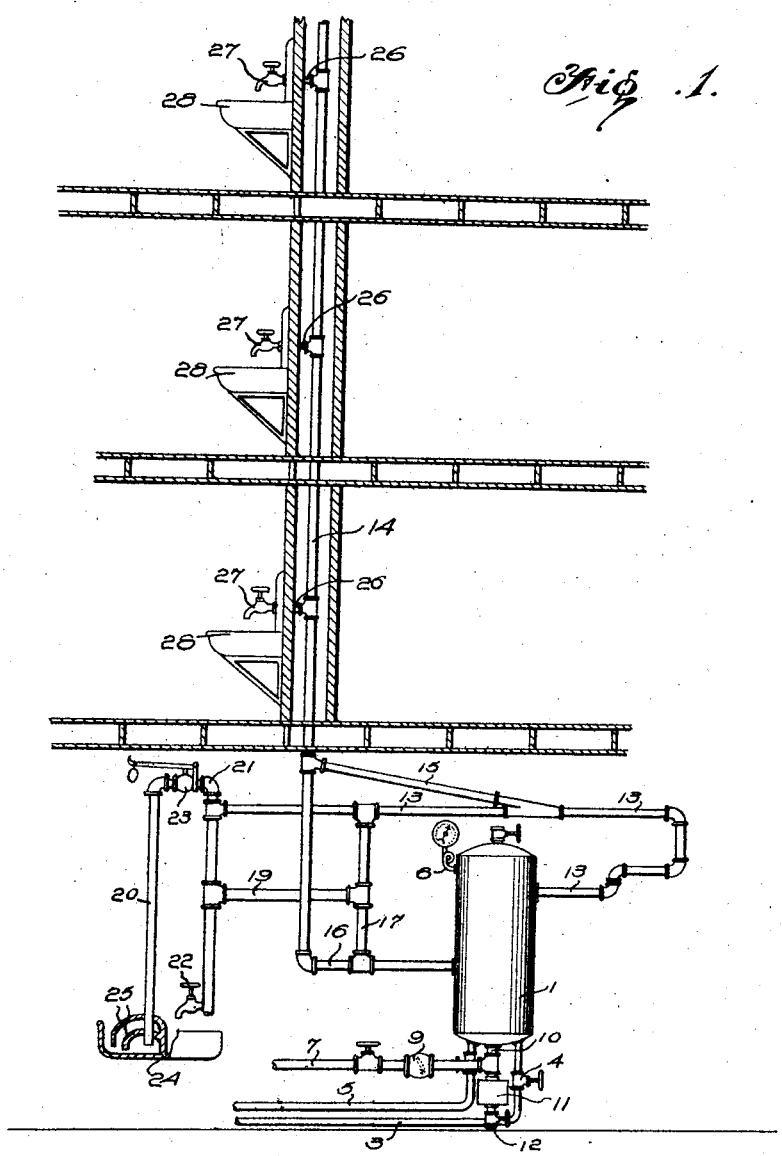
Figure 1 is a side elevation showing the invention applied.

Referring to the drawings, the reference numeral 1 designates a tank or receptacle employed as a heater. This tank may be provided with a steam coil 2 for heating purposes, the steam being delivered to the coil through pipe 3, provided with a control valve 4, and returned through pipe 5, the pipes 3 and 5 being connected to the ends of the coil in any suitable manner. The heater is further provided with a pressure gauge 6.

Water to be heated is admitted to the heater from a source of supply through a pipe 7, provided with a hand valve 8. A check valve 9 is arranged in this pipe to prevent the heated water from flowing outwardly and returning to the system. The pipe 7 communicates with a vertical pipe 10, arranged at the bottom of the boiler and provided with a sediment trap 11. The sediment trap is provided with a valved drain pipe 12.

The heater is provided with a hot water outlet 13, communicating with the main pipe 14 of the system by means of an inclined branch pipe 15. The lower end of the main pipe is provided with a return branch pipe 16, connected to the heater at a point below the outlet branch 13. An equalizing return branch 17 is arranged between the pipes 13 and 16. The pipe 13 is connected to a substantially vertical pipe 18, and the pipe 17 is also connected thereto by a branch 19. A second pipe 20 is arranged substantially parallel to the pipe 18, and these two pipes are connected by fittings 21, forming a substantially inverted U-shaped member. The pipe 18 is provided with a valved outlet 22, and a safety valve 23 is arranged between the pipes 18 and 20. The lower end of the pipe 20 is open and is adapted to discharge into a sink 24 when the safety valve is open. A plurality of spaced baffle plates 25 are arranged over the end of pipe 20 to muffle the sound caused by discharge of hot water or hot water and steam when the safety valve is operated.

The main vertical pipe 14 is provided with a plurality of branches 26 communicating with offsets 27 arranged within sinks 28.

The invention may be used for heating water for any purpose. In the accompanying drawings, I have shown the invention used for heating water for washing, and have shown three outlet branches arranged on different floors of a building, one above the other. It is, of course, to be understood that any number of outlets may be used, according to the necessities of the particular installation, and that they may be arranged on different parts of the same floor and connected to the main pipe 14 by suitable horizontal branches.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A water heating and circulating system, comprising a heater, a main pipe, an outlet pipe connected to the heater at a point near the top, and being connected to said main pipe, a return pipe connected to said main pipe and to said heater, said outlet pipe extending beyond said main pipe connection, a U-shaped pipe connected to the end of said outlet pipe, and a safety valve arranged in said U-shaped pipe.

2. A water heating and circulating system, comprising a heater, a main pipe, an outlet pipe connected to the heater at a point near the top and being conected to said main pipe, a return pipe connected to said main pipe and to said heater, said outlet pipe extending beyond said main pipe connection, a U-shaped pipe having one arm connected to the end of said outlet pipe, the other arm of said pipe being open, a safety valve arranged between said arms, and a muffler comprising a plurality of spaced plates surrounding the open end of said U-shaped pipe.

In testimony wherof I affix my signature in presence of two witnesses.

PATRICK J. MOLLOY.

Witnesses:
THOMAS O'DONNELL,
WILLIAM WOHLGEMUTH.